(12) United States Patent
Eromäki et al.

(10) Patent No.: US 6,748,249 B1
(45) Date of Patent: Jun. 8, 2004

(54) ELECTRONIC DEVICE WITH A SLIDING LID

(75) Inventors: Marko Eromäki, Tampere (FI); Jukka-Pekka Inkinen, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/563,739

(22) Filed: May 3, 2000

(30) Foreign Application Priority Data

May 3, 1999 (FI) .................................................. 991007

(51) Int. Cl.[7] ................................................ H04M 1/00
(52) U.S. Cl. .................. 455/575.4; 455/566; 455/575.8
(58) Field of Search .......................... 455/566, 550.1, 455/575.1, 89, 575.3, 575.4, 90.3, 575.8, 347, 349, 351, 433.04, 433.11, 433.12, 433.13, 433.01; 379/433, 38; 343/702

(56) References Cited

U.S. PATENT DOCUMENTS

| | | | | |
|---|---|---|---|---|
| 5,151,946 A | * | 9/1992 | Martensson | 379/38 |
| 5,422,656 A | | 6/1995 | Allard et al. | 345/173 |
| 5,440,629 A | * | 8/1995 | Gray | 379/433.12 |
| 5,450,619 A | * | 9/1995 | Maeda | 455/566 |
| 5,497,506 A | * | 3/1996 | Takeyasu | 455/89 |
| 6,073,027 A | * | 6/2000 | Norman et al. | 455/550 |
| 6,128,475 A | * | 10/2000 | Wicks et al. | 455/90 |
| 6,157,718 A | * | 12/2000 | Kaschke | 379/433 |
| 6,191,742 B1 | * | 2/2001 | Ha et al. | 343/702 |
| 6,208,874 B1 | * | 3/2001 | Rudisill et al. | 455/575.4 |
| 6,233,469 B1 | * | 5/2001 | Watanabe | 455/575 |
| 6,311,076 B1 | * | 10/2001 | Peuhu et al. | 455/566 |
| 6,377,827 B1 | * | 4/2002 | Rydbeck | 455/575 |

FOREIGN PATENT DOCUMENTS

| | | |
|---|---|---|
| DE | 3323858 A1 | 1/1985 |
| DE | 29713765 | 11/1997 |
| EP | 0650282 A1 | 4/1995 |
| WO | WO 89/12945 | 12/1989 |
| WO | WO 94/13088 | 6/1994 |

OTHER PUBLICATIONS

GB 2291560, Motorola, Inc., English translation of the abstract.
*English translation of the abstract.
**English translation of the abstract.

* cited by examiner

*Primary Examiner*—Erika Gary
(74) *Attorney, Agent, or Firm*—Perman & Green, LLP (57) ABSTRACT

A portable electronic device, which has a slidingly attached touch screen (DPL1) and a sliding lid (SL1) also slidingly installed on top of the touch screen. A keyboard (KB1) is installed on top of the sliding lid. In a normal state, the display of the device is partly covered by the sliding lid and, thus, protected by the sliding lid against mechanical stress. When necessary, the display can be revealed by moving the sliding lid away from the display, whereupon a cogging (R1) made on the bottom of the sliding lid rotates a cogwheel (CW1), attached inside the device, that touches the cogging. The cogwheel transmits the movement of the sliding lid to a movement that is opposite to that of the sliding lid of the display, through a gear rack R2 attached to the display. Correspondingly, the device can again be brought to the normal state by moving the sliding lid back on top of the display or the display to underneath the sliding lid, whereupon the cogged surfaces that touch against each other cause the remaining moving element to move, and again bring the device to the normal state.

27 Claims, 8 Drawing Sheets

(PRIOR ART)

ELECTRONIC DEVICE WITH A SLIDING LID

FIELD OF THE INVENTION

The present invention relates to electronic devices with a sliding lid, particularly to the structure of a handheld electronic device with a sliding lid.

BACKGROUND OF THE INVENTION

Due to the development of electronics, today it is possible to manufacture smaller and smaller electronic devices for a variety of uses, for example, for use as mobile phones, positioning devices and remote controls. Although the small size of a device makes it easier to carry and store it, less space is left for the parts of a user interface required for use. Therefore, when designing such devices the aim is to take into consideration the requirements that are contradictory to each other with regard to the minimisation of the size of the device, on one hand, and as clear a user interface as possible when considering the comfort of use and usability, on the other hand. For example, when the outer surface of a mobile station becomes smaller less and less space is left for the keys and the display intended for its use. As for the comfort of use and usability, however, it is essential that a mobile station has a large display and good-sized keys. When using a mobile station for WWW-browsing and transferring images or a moving picture, the need for a large display and a good user interface is emphasised. One way to manufacture a small-sized electronic device without simultaneously limiting the size of the display and that of the keyboard too much is to combine the display and the keyboard by using a touch screen. On the other hand, it is possible to arrange a better contact with push buttons than with a touch screen. In addition, with push buttons, adjacent keys can normally be distinguished from each other better than with a touch screen and the number of incorrect keying can be reduced. The reading of the display is not impeded even if the push buttons become dirty and/or scratched because one does not have to see through them. The wearing of a touch screen, on the other hand, impedes the use of the display.

Figure 1:
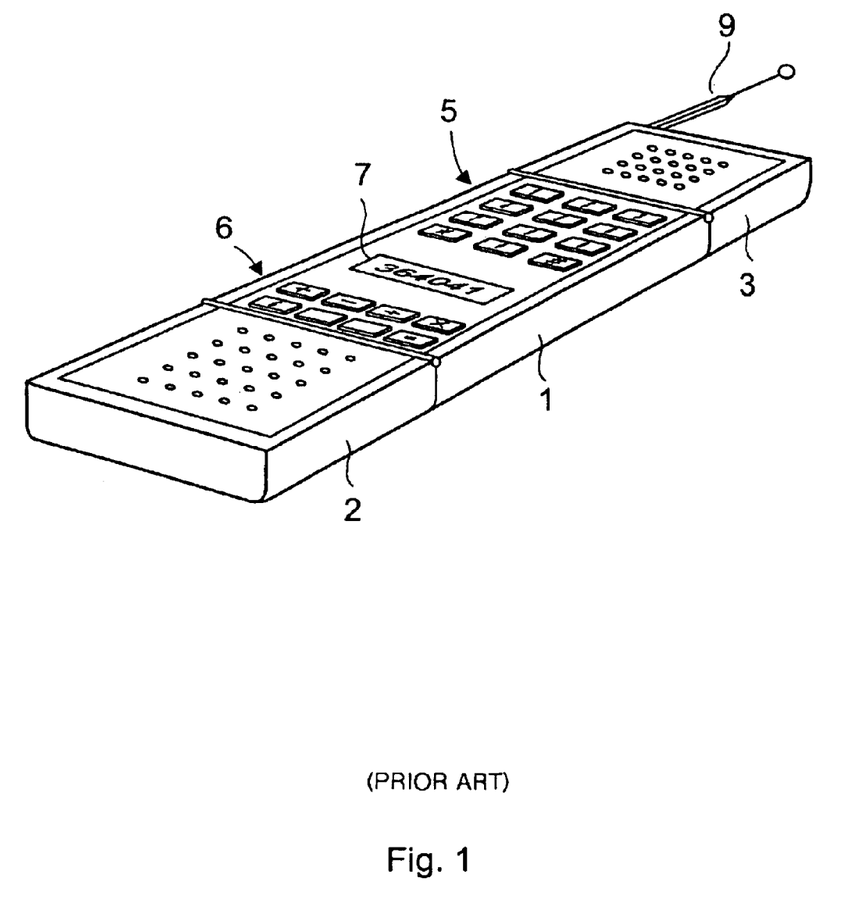
FIG. 1 shows a wireless telephone of the patent publication DE 33 23 858.

In some mobile station models attempts have been made to solve the problems presented above by constructing a device that comprises two hinged parts. A flap can protect a touch screen from becoming scratched, as is presented in the patent application publication GB 2 291 560. In some of these, a hinge is placed in the lower part of the device around which a flap opens up revealing the keys that are underneath it, in a shelter. However, a hinged flap always increases the size of a device in the same way, without adjustability. FIG. 1 shows a combination of a wireless telephone and a pocket calculator according to the patent publication DE 33 23 858, which has three parts hinged to each other. However, in the solution a set of conductors must be led from one part to another, because there an antenna 9 and the speaker of the earpiece are in a part 3, a keyboard 5,6 and a display 7 are in a body 1 and the microphone is in a part 2. Particularly, taking the antenna cable from one turning part to another is a problematic task. The antenna conductor must be protected by a conducting sheath surrounding the conductor. Normally, this is implemented by using a coaxial cable, where the antenna conductor is surrounded by an insulator and the insulator is surrounded by a conductor web. Such a cable is more sensitive to bending than a single-layer cable. Neither can the device be used without first opening the device. It is difficult to open the device, because a body 2 of the device is covered with opening parts 2 and 3. A user must either hold the device by the lower edge of the body, however, without preventing the opening of the parts 2 and 3 or, alternatively, open the parts 2 and 3 in turn. The device is also shaky when opened unless some kind of a lock is connected to the hinges, which again leads to a mechanically complex structure.

One solution where the size of a mobile phone is increased adjustably is known, e.g. from Nokia™ 8110 and 8810 GSM phones, wherein approximately one half of the lid of the device slides aside revealing the keys. In a Nokia™ 8810 GSM phone, one part of the keys are all the time visible and the other part of the keys remain concealed underneath a closed lid and are again revealed when the lid is slid aside. The solution is good in that it allows opening carried out by a one-hand grip but when moving the lid by a one-hand grip, e.g. the thumb, it is difficult to extend the length of the path so much that the user-can easily reveal a significant extent of the user interface, e.g. the keys or the touch screen.

SUMMARY OF THE INVENTION

Now an electronic device with a sliding lid has been invented, which device has at least two slideable elements, which are arranged to move in relation to the body of the device and to be moved with a single movement.

According to the invention, a portable electronic device is provided, comprising:
  a body;
  a first element slideably fitted to move in relation to the body between a first position and a second position;
  a user interface comprising a set of keys and a display, the display having a visible part; characterised by the device having:
    a second element slideably fitted to move in relation to the body between a third position and a fourth position;
    a first configuration, in which the visible part of the display is reduced; and
    a second configuration, in which the visible part of the display is extended.

As an advantage of the invention, the user interface of an electronic device can be extended and reduced with one hand without having to move the elements that limit the user interface one by one. In addition, sensitive components of a device according to the invention can be protected for the duration of transport and storage by sliding a protecting surface in front of them. Furthermore, as an advantage of the invention, it is possible to construct a device to be collapsed in a small space, whereupon it takes less space and is easier to carry, e.g. in a pocket. With the help of the invention, it is possible to construct a small-sized mobile station that is easy to carry with without impeding the use of the mobile station, e.g. in browsing www-pages known from the Internet. The use of moving elements according to the invention also allows an adjustable distance between the microphone and the earpiece.

BRIEF DESCRIPTION OF THE DRAWINGS

In the following, the invention will be explained in detail by referring to the enclosed drawings, in which.

DETAILED DESCRIPTION

Figure 2:
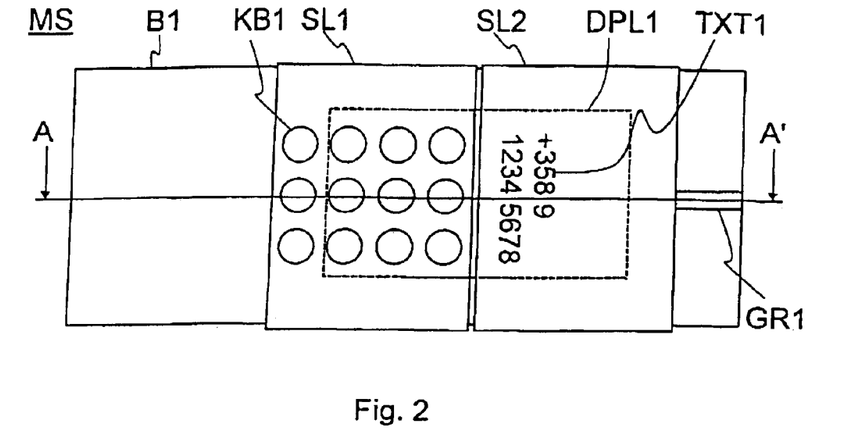
FIG. 2 shows a mobile station according to a first embodiment of the invention when closed, viewed from above.

FIG. 2 shows a mobile station MS according to a first embodiment of the invention when closed, i.e. in its transport state, viewed from above. MS comprises an elongated body B1, rectangular from the side. A liquid crystal display DPL1 is embedded in the centre part of the body, flush with the outer surface of the body. On top of the display, on the body, a first lid SL1 comprising a keyboard KB1 and a second lid SL2 are slidingly fitted with the help of conductors (not shown in the figure). The second lid is preferably transparent, more preferably of shock-resistant transparent plastic, and when it is on top of the display it acts as a lens of, the part of the display that is visible through the second lid. Techniques well known from prior art can be used for slidingly attaching the lids, e.g. as in a Nokia 8110 mobile phone. The conductors allow the moving of the lids along the outer surface of the mobile station over the display against each other and according to FIG. 4, at a distance from each other, whereupon the display is revealed at least partly, preferably in full. The mobile station also comprises a transfer mechanism for moving the lids with a single movement, e.g. as a result of the moving of the first lid.

Figure 3:
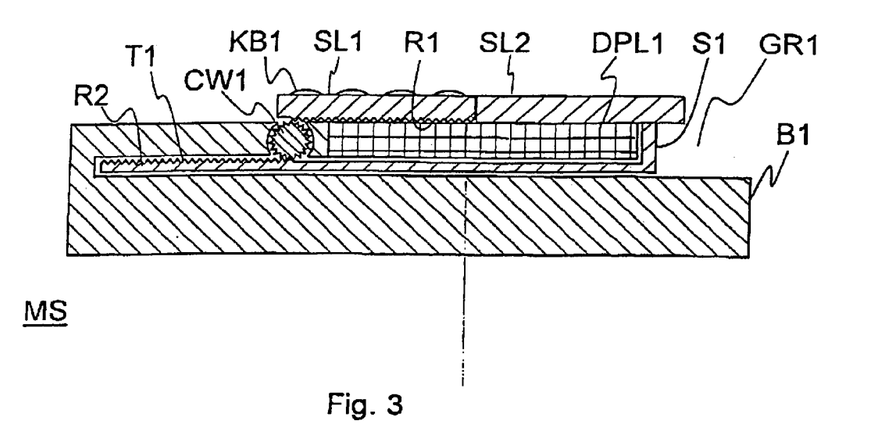
FIG. 3 shows a mobile station according to the first embodiment of the invention when closed, as cut and viewed from one side.

FIG. 3 shows the mobile station of FIG. 2 viewed from one side and cut in accordance with the line A–A'. In this embodiment, the transfer mechanism comprises a cogwheel CW1, as well as cogged surfaces attached to each lid, which are fitted to press against the cogwheel. The cogwheel is preferably placed in the body so that it touches directly a cogging R1 made on the surface of one lid, facing the body. In this case, a gear rack R2 is attached to the second lid underneath the display DPL1, on the other side of the wheel. In the body, a spacious channel T1 is arranged for the gear rack, parallel with the body, wherein there is room for the gear rack to move for the required distance when the lid is opened and closed. The second lid is connected to the gear rack through a groove GR1 made in the body by means of a vertical piece S1 that is led from the lid to the gear rack.

Figure 4:
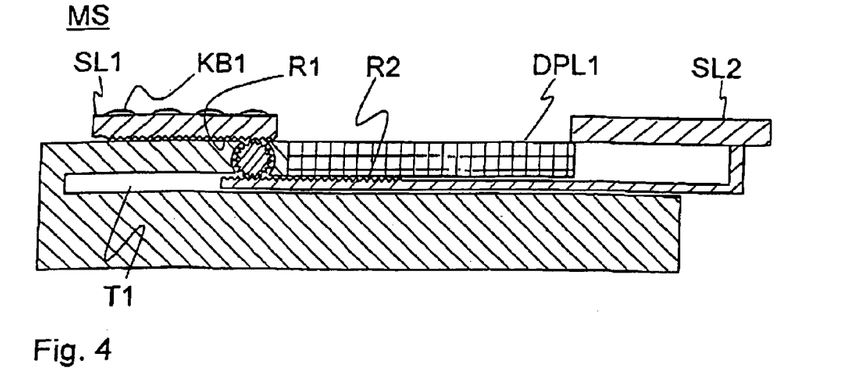
FIG. 4 shows the mobile station of FIG. 2 when opened, as cut and viewed from one side.

FIG. 4 shows the mobile station of FIG. 2 when opened and viewed from one side. The first lid SL1 of the mobile station has been pulled towards the end of the mobile station (to the left in the figure), whereupon due to the movement of the cogging R1 of the first lid the cogwheel has rotated and moved the second lid SL2 in a direction opposite to the direction of the first lid SL1, through the cogging of the gear rack R2. In this case, the display DPL1 is preferably fully revealed for use. The display is preferably a touch screen. The mobile station can again be closed by moving either of the lids towards the centre part of the mobile station, whereupon the coggings and the cogwheel cause both lids to approach each other simultaneously. In this case, the movement of one lid, a specific distance in length, causes the opening between the lids to become double the distance in question. Thus, it is also possible to move two lids from the top of the display at the same time. As an alternative embodiment, a push spring (not shown in the figure) can be placed between the channel T1 and the end of the gear rack and it is possible to arrange in the mobile station a lock (not shown) with which the lids can be kept against each other. By releasing the lock the lids can be made to open by a springback force.

Figure 5:
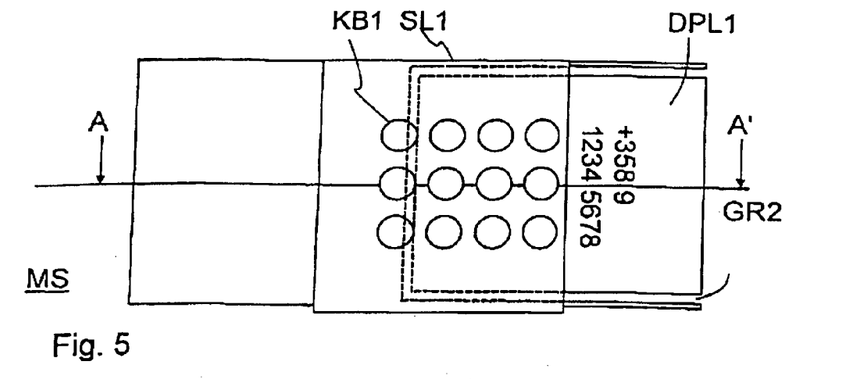
FIG. 5 shows a mobile station according to a second embodiment of the invention when closed, viewed from above.

FIG. 5 shows a mobile station according to a second embodiment of the invention when closed, viewed from above. The mobile station comprises an elongated rectangular body B1. At one end of the body there is a second groove GR2 almost as wide as the mobile station, wherein a display DPL1 is embedded. The second groove reaches from the end of the mobile station approximately to the centre of the mobile station. The display is slidingly attached parallel with the body, so that it can be moved to outside the body. Part of the display is covered with a first lid SL1 slidingly attached on top of the centre part of the mobile station. A keyboard KB1 is attached to the lid.

Figure 6:
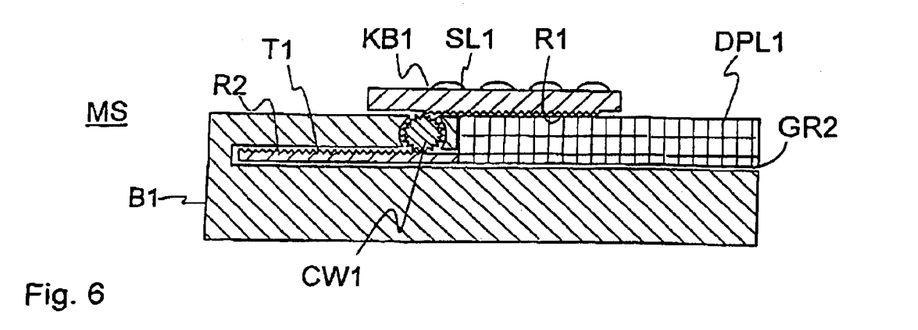
FIG. 6 shows the mobile station of FIG. 5 when closed, as cut and viewed from one side.

FIG. 6 shows the mobile station of FIG. 5 when closed, as cut along the line A–A' and viewed from one side. The display DPL1 is placed in the second groove GR2, also shown in FIG. 5. The display sets on the bottom of the groove and its upper edge comes to the level of the upper edge of the mobile station, as seen in FIG. 5. A channel T1 is made in the mobile station from the groove made for the display, parallel with the body. A gear rack R2 is slipped into the channel. The gear rack has two ends one of which is attached to the end of the display DPL1. A rotatably attached cogwheel CW1 is embedded approximately in the centre of the mobile station from the upper edge of which the bottom of the cogging reaches almost to the level of the upper edge of the body and the ridges of the teeth extend over the upper edge of the body. The first sliding lid is slidingly attached approximately to the centre of the mobile station, on top of the display and the body B1. The sliding lid is supported using means well known from prior art so that the lid can be moved in the direction of the body, but it is still being supported in the direction of the normal plan of the lid. This can be implemented, e.g. by extending the edges of the lids over the sides of the mobile station and by leading them into grooves made on the sides of the mobile station, as in a Nokia 8110 mobile phone. In the part for the cogwheel of the first sliding lid, a cogging R1 is shaped from its underside. The cogging R1 transmits the movement of the first sliding lid through the cogwheel CW1 to the gear rack and further to the movement of the display.

Figure 7:
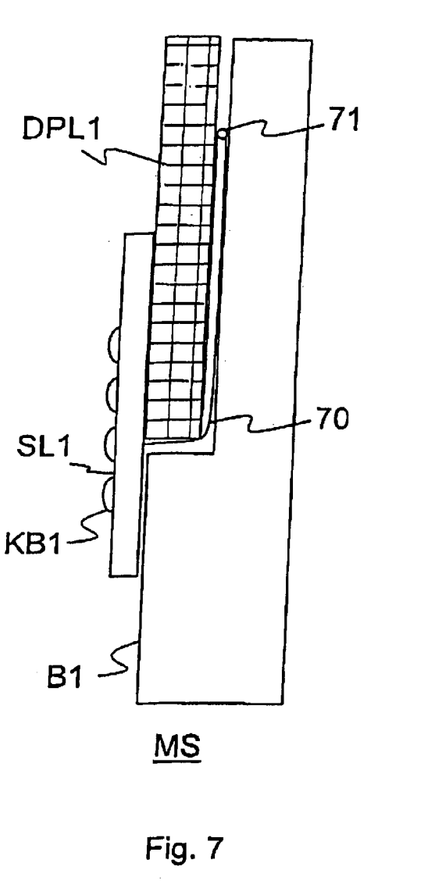
FIG. 7 shows a mobile station according to a third embodiment of the invention when closed, as cut and viewed from one side.

FIG. 7 shows a mobile station according to a third embodiment of the invention when closed, as cut and viewed from one side. The mobile station shown in FIG. 7 corresponds to the mobile station shown in FIG. 5 when viewed from above and it is cut along the line A–A', shown in FIG. 5. The mobile station corresponds otherwise to a mobile station according to the second embodiment of the invention but in this embodiment, gear transmission is replaced by a wire 70 and a string wheel 71. A first end of the wire 70 is attached to a first lid of the mobile station that is in a closed position, to its inner surface. From here, the wire is led further to underneath a display DPL1 and after running underneath the display for a specific distance, around the string wheel 71. After going round the string wheel 71, the wire is led back near to the centre part of the mobile station, where it is attached to the display. The wire is dimensioned so that when the display is closed and the first lid is in the centre of the mobile station, the wire only has a small clearance. In this case, the moving of the first sliding lid away from the display tightens the wire and pulls the display in the opposite direction. Alternatively, it is possible to arrange the returning of the moving parts, e.g. using springs or constructing a loop from the wire. When using a loop, the structure can be, e.g. belt drive, known to a person skilled in the art. It will be appreciated that also some other flexible means, such as a belt, a wire rope or a chain can be used instead of a wire.

Figure 8:
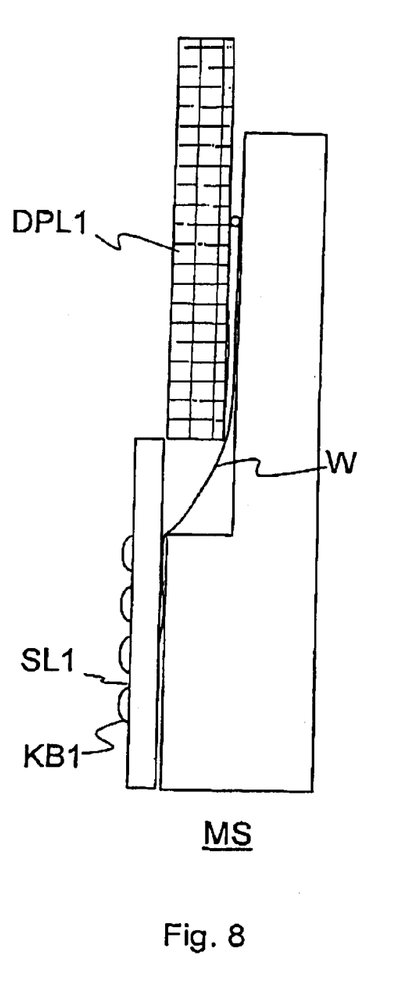
FIG. 8 shows the mobile station of FIG. 7 when opened, as cut and viewed from one side.

FIG. 8 shows the mobile station of FIG. 7 when opened, as cut and viewed from one side. The sliding lid SL1 has been slid to the end of the mobile station, whereupon the wire W has tightened and pulled the display DPL1 in the opposite direction and the surface of the display has been revealed fully from underneath the sliding lid SL1 for use as a touch screen.

Figure 9:
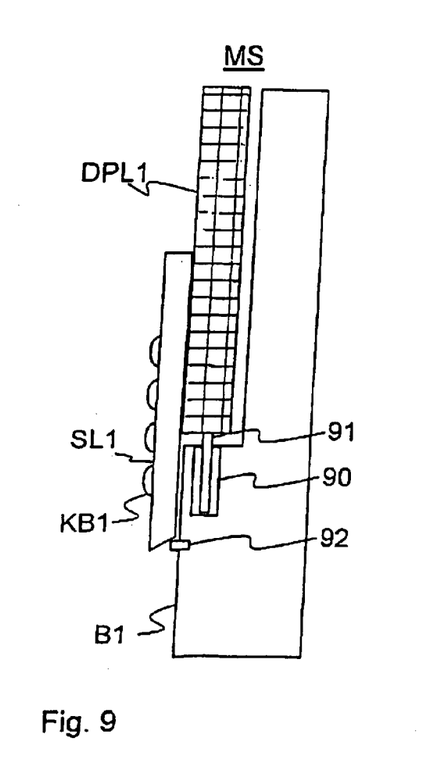
FIG. 9 shows a mobile station according to a fourth embodiment of the invention when closed, as cut and viewed from one side.
Figure 10:
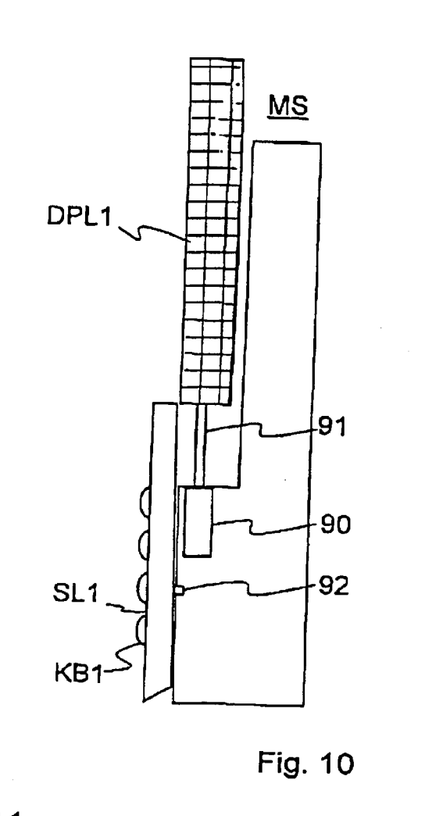
FIG. 10 shows the mobile station of FIG. 9 when opened, as cut and viewed from one side.

FIG. 9 shows a mobile station according to a fourth embodiment of the invention when closed, as cut and viewed from one side. The mobile station shown in FIG. 9 is otherwise as the mobile station in FIG. 7, but here the moving of a display DPL1 is arranged by means of a solenoid 90. The solenoid is embedded in a body B1 of the mobile station at the end of a groove arranged for the display, against the end of the display. The solenoid comprises a spindle 91, which is shown here as withdrawn inside the solenoid and in FIG. 10, as protruded. The spindle is attached at its other end to the end of the display. The end of a sliding lid SL1 is bevelled at its other end, on the side of the body. A microswitch 92 is embedded in the body of the mobile station at the end of the sliding lid, by the bevelling. The microswitch is arranged to control the solenoid so that when the microswitch switches on the current when being compressed, a current is being formed in the solenoid which produces a force for pushing the spindle out and for moving the display to its opened position, as shown in FIG. 10. For saving energy, the current is preferably switched off after the opening of the display.

Correspondingly, when the compression of the microswitch has stopped, the microswitch controls the solenoid to pull the spindle inside it, whereupon the spindle pulls the display to its closed position. Alternatively, instead of a solenoid also other electric actuators known from prior art can be used for moving the display between its opened and closed positions.

Figure 11:
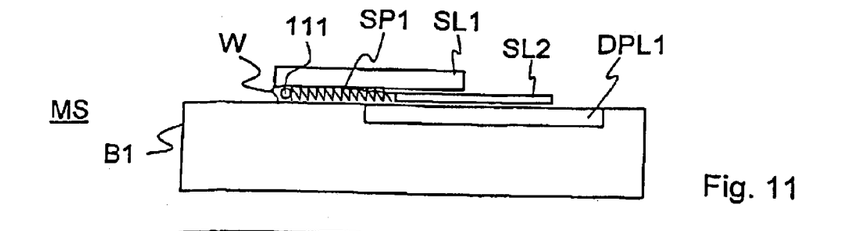
FIG. 11 shows a mobile station according to a fifth embodiment of the invention when opened, as cut and viewed from one side.
Figure 12:
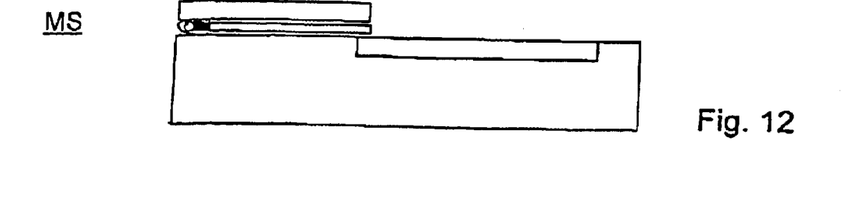
FIG. 12 shows the mobile station of FIG. 11 when closed, as cut and viewed from one side.
Figure 13:
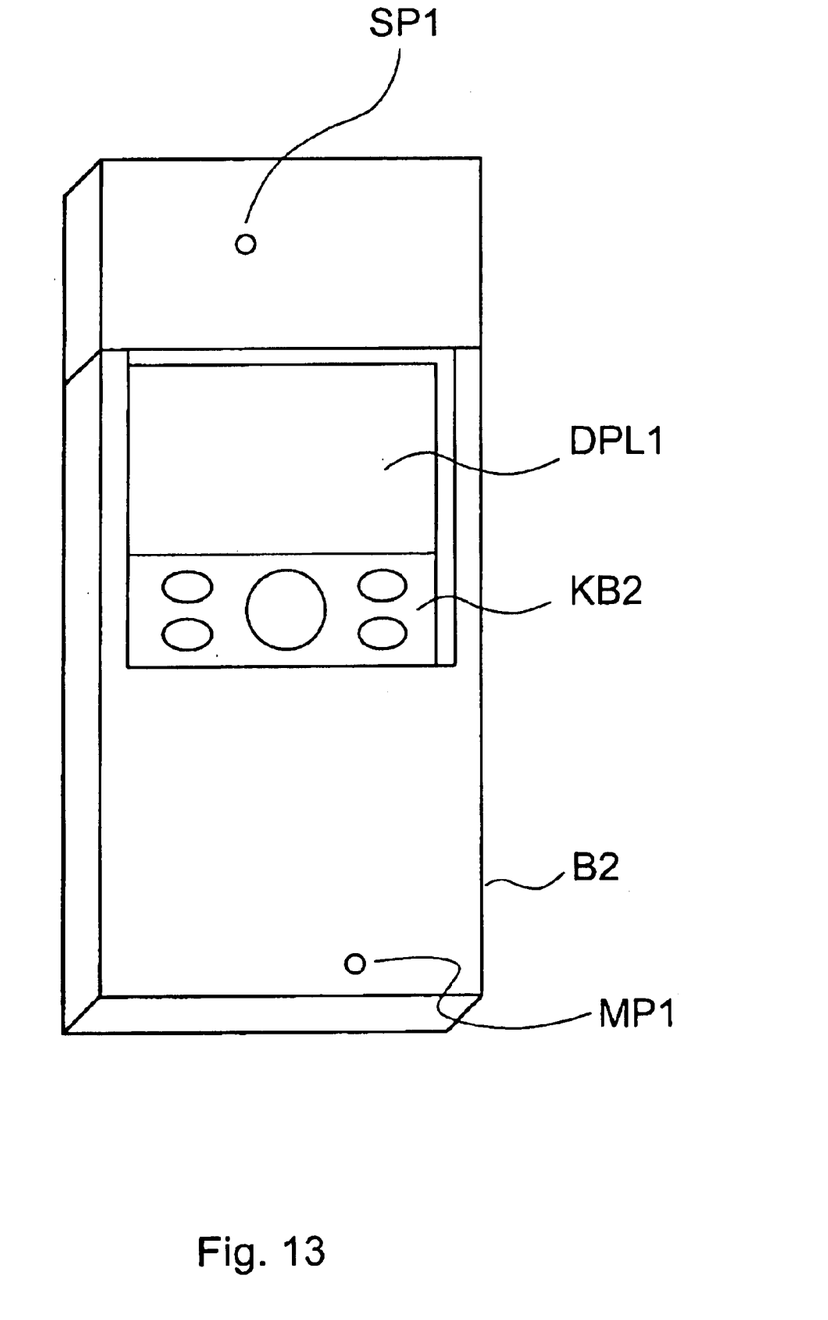
FIG. 13 shows a mobile station according to a sixth embodiment of the invention in a closed configuration.
Figure 14:
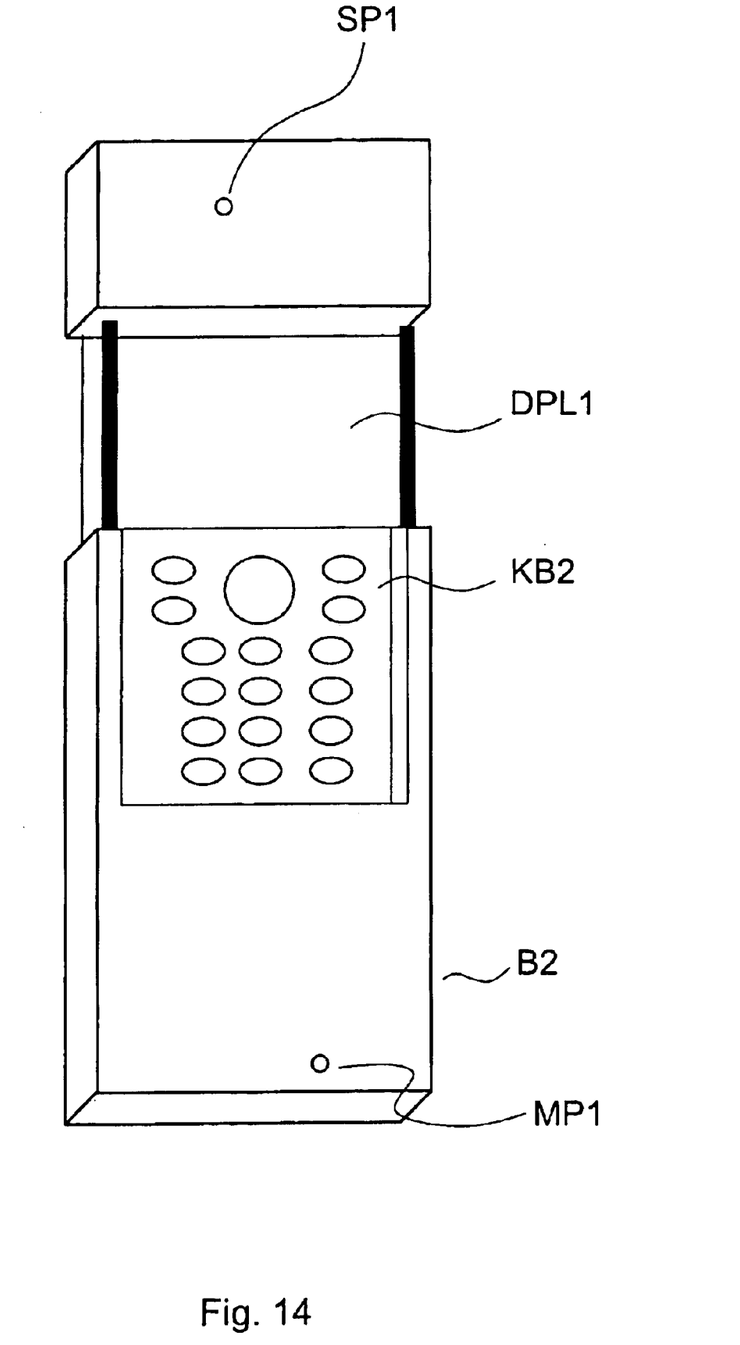
FIG. 14 shows the mobile station of FIG. 13 in a first opened configuration.
Figure 15:
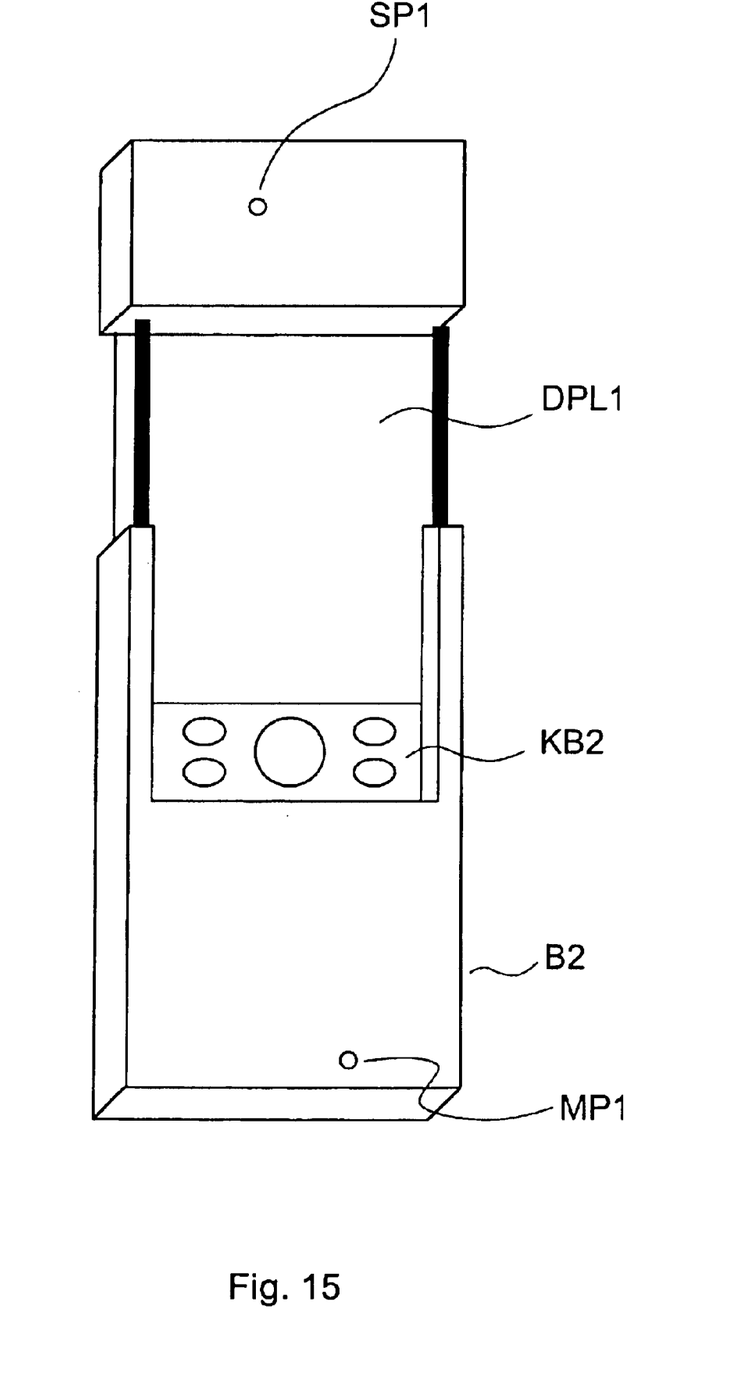
FIG. 15 shows the mobile station of FIG. 13 in a second opened configuration.

FIG. 11 shows a mobile station according to a fifth embodiment of the invention when opened, as cut and viewed from one side. The mobile station comprises an elongated body B1 on one side of which a display DPL1 is installed. A second sliding lid SL2 is arranged to protect the display, the back edge of the lid being covered by a first sliding lid SL1. Both sliding lids are attached to the body so that they can be moved along the body away from the top of the display and returned on the top of the display, to protect the display. The mobile station also comprises a mechanism for moving both sliding lids at the same time when the first sliding lid is being moved. The mechanism comprises a string wheel 111 attached to the first sliding lid between the first sliding lid and the mobile station body. A first end of a wire is attached to the mobile station body underneath the first lid and the string wheel folds the wire W, attached to the body underneath the first sliding lid SL1, towards the second sliding lid SL2 whereto a second end of the wire is attached. When moving the first lid away from the top of the display, the string wheel pulls the second sliding lid from the top of the display at double the speed of the first sliding lid for pulling the second sliding lid to underneath the first sliding lid when the display is being revealed, as shown in FIG. 12. In addition, the mobile station comprises a push spring SP1, which is placed between the first sliding lid and the body or more preferably a part of the second sliding lid, as in this example, the string wheel. Thus, pulling the first sliding lid away from the top of the display presses the spring in between the string wheel and the first sliding lid, whereupon the returning of the first sliding lid SL1 from the opened position, shown in FIG. 12, to the closed position, shown in FIG. 11, pushes the second sliding lid SL2 on top of the display, through the spring SP1. The spring also allows the forcing of the second sliding lid away from the top of the display without breaking the mechanism. The spring is preferably dimensioned to be so weak that it is unable to return the sliding lids on top of the display, but only to move the second lid into its place on top of the display when the first lid is being closed. FIGS. 13, 14 and 15 show a sixth embodiment of a mobile station. The mobile station comprises a body B2, a display DPL1 and a keyboard KB2. The display and the keyboard are both mounted for slideable movement on the body. The display has an end-part which carries a speaker SP1. The body carries a microphone MP1. The speaker and the microphone are located at opposite ends of the mobile station. This embodiment provides a user with a telephone handset that extends and shortens according to relative movements between the body B2 and the display DPL1.

FIG. 13 shows the mobile station in a closed configuration. FIG. 14 shows the mobile station in a first opened configuration. FIG. 15 shows the mobile station in a second opened configuration.

When the mobile station is in the closed configuration the display DPL1 and the keyboard KB2 are mostly or wholly contained in a space in the body. In this configuration, the display lies between the body and the keyboard. The space is open at one end of the body B2 to allow the display to be extended outside the body B2 when the mobile station is in one of its opened configurations. Furthermore, the body B2 has an opening on one side to allow access to part of the display and keyboard even when the mobile station is in its closed configuration.

The movements of the display DPL1 and the keyboard KB2 are explained in the following with reference to FIGS. 14 and 15.

FIG. 14 shows the mobile station of FIG. 13 in a first opened configuration and FIG. 15 shows the mobile station of FIG. 13 in a second opened configuration. In the first opened configuration, the mobile station is extended so that both the keyboard KB2 and display DPL1 slide in relation to the body, but not in relation to each other. Hence, an extended area of the keyboard becomes accessible for the user. The accessible size of display does not significantly change. In the second opened configuration, the display DPL1 is extended in relation to the body B2, but the keyboard KB2 is not so moved. Therefore, the keyboard KB2 remains, relative to the body B2, as it is in the closed configuration so that only a few keys are accessible. It is possible to change the configuration of the mobile station between the closed configuration and the second opened configuration via the first opened configuration. The mobile station is first opened to the first opened configuration and then the keyboard is pushed in a position in which it covers less of the display DPL1 so that a greater area of the display DPL1 is accessible to the user.

In the closed configuration, the user may conveniently carry and use the mobile station as a compact device with a small display and a small keyboard. In the first opened configuration, the mobile station can be used for tasks that require a more complete keyboard but not necessarily more display surface, for example in dialling a telephone number or typing a text message. In the second opened configuration, the mobile station can be used for tasks requiring an extended display.

In a variant of the above sixth embodiment, the mobile station is able to change from the closed configuration to the second opened configuration without the first opened configuration being an intermediate stage between these configurations. Starting from a closed configuration, either the display can be moved alone to reach the second opened configuration or both the display and the keyboard can be moved to reach the first opened configuration. The mechanism for moving the keyboard KB2 and the display DPL1 corresponds to any appropriate mechanisms including those explained earlier in relation to other aspects and embodiments of the invention. The mobile station has a user selectable input for recognising which of the alternative movements is to occur. This input is typically implemented by two different buttons or a dual-action button. Using a first selection the user can cause the mobile station to open from the closed configuration to the first opened configuration. Using a second selection, the user can cause the mobile station to open from the closed state automatically to the second opened configuration. This spares the user from the trouble of manually sliding the keyboard back to shift from the first opened configuration to the second opened configuration.

The keyboard KB2 comprises mechanical switches coupled to activate electronic functions of the mobile station. Alternatively, the display DPL1 is of the touch-sensitive screen type and the keyboard KB2 comprises a set of press-through keys for actuating portions of the touch-sensitive display portion behind it. This alternative implementation is advantageous, because, at a certain moment in time, either the display DPL1 or the keyboard KB2 is extended to the full length. Hence, only a small portion of the display is reserved for sensing key actuation, when the mobile station is in the second opened configuration. Yet a reasonably large keyboard is provided for use in the first opened configuration.

The sixth embodiment may be modified to provide the mobile station with at least one intermediate configuration between the first and second opened configurations in which the body B2 covers some, but not all, of the keys. In this intermediate configuration, the display DPL1 is extended as in the first and second configurations, but the keyboard KBD2 is between positions shown in FIGS. 14 and 15. For example, the keyboard KBD2 may be partially slid into the body B2 so that the body covers some of the keys. Alternatively, in the first opened configuration, the keyboard may be entirely slid into the body B2 so that no keys are accessible to the user.

This paper presents the implementation and embodiments of the invention with the help of examples. A person skilled in the art will appreciate that the present invention is not restricted to details of the embodiments presented above and that the invention can also be implemented in another form without deviating from the characteristics of the invention. The presented embodiments should be regarded as illustrative but not restricting. For example, moving elements can be arranged to move in the same direction but at different speeds for forming a structure that opens and closes telescopically. Alternatively, the elements can be arranged to move at any angle with respect to each other as, e.g. perpendicularly or diagonally with respect to each other. Thus, the possibilities of implementing and using the invention are only restricted by the enclosed claims, and the various options of implementing the invention as determined by the claims, including the equivalent implementations, also belong to the scope of the invention.

What is claimed is:

1. A portable electronic device having:
   a body;
   a first element slideably fitted to move in relation to the body between a first position and a second position;
   a user interface comprising a set of keys and a display, the display having a visible part, and the display comprising multiple lines for displaying information;
   a second element slideably fitted to move in relation to the body between a third position and a fourth position that is opposed to the first and second position;
   wherein the device further comprises moving means for moving one of the first element and the second element from one position to another position on moving the other element from its one position to another position;
   a first configuration, in which the visible part of the display is reduced so that not all the display lines are visible; and
   a second configuration, in which the visible part of the display is extended so that more display lines are visible than in the first configuration.

2. A portable electronic device according to claim 1, wherein in the first configuration, the visible part of the display is reduced by a component selected from a group consisting of: the second element, the body and the first element.

3. A portable electronic device according to claim 1, wherein the first element comprises at least a subset of the keys.

4. A portable electronic device according to claim 1, wherein in the first configuration, the first element is in the first position and the second element is in the third position; and
   in the second configuration, the first element is in the second position and the second element is in the fourth position.

5. A portable electronic device according to claim 1, wherein the body has a space for accommodating part of the second element when the second element is in the third position.

6. A portable electronic device according to claim 1, wherein the device has a third configuration, in which the first element is in the second position and the second element is in the third position.

7. A portable electronic device according to claim 1, wherein the means for moving the second element comprises one of the following: a resilient member and electrical moving means.

8. A device according to claim 1, wherein said moving means is arranged to move at least one of the first and the second element in response to a user initiation.

9. A device according to claim 1, wherein said moving means comprises:
- a cogwheel rotatably fitted into the body;
- a first cogging part attached to the first element against said cogwheel for rotating the cogwheel in response to the moving of the first element; and
- a second cogging part attached to the second element against the cogwheel for moving the second element through the cogwheel in response to the moving of the first element.

10. A device according to claim 1, wherein said moving means comprises:
- a wire attached to said first element, which is arranged to tighten in response to the moving of one of the first element and the second element so that the wire moves the other element.

11. A device according to claim 1, wherein:
- the device further comprises means for receiving a command for moving the elements; and
- the moving means are arranged to move at least one of said first and second elements in response to the giving of the moving command.

12. A device according to claim 11, wherein said means for receiving the command for moving the elements comprises:
- recognition means for recognising the moving of the first element for receiving the moving command implemented by moving said element.

13. A device according to claim 1, wherein said second element is fitted to move in relation to the movement of said first element in one of the following directions: substantially in an opposite direction, substantially in a parallel direction, substantially perpendicularly and diagonally.

14. A device according to claim 1, wherein said elements are slideable one on top of the other.

15. A device according to claim 1, wherein the movements of said first and second elements with respect to the body of the device are proportional to each other.

16. The device according to claim 1 wherein the display is usable in both the first and the second configurations.

17. The device according to claim 1 wherein in the first configuration the display is used for displaying telephone numbers and text messages, and in the second configuration the display is used for tasks requiring an extended display.

18. The device according to claim 1 wherein the visible part of the display is only partially reduced by a sliding movement of the first and second element.

19. The device according to claim 1 wherein the first element and the second element are located on a same plane and adapted to simultaneously move between the first configuration and the second configuration.

20. The device of claim 1 wherein, in the first configuration, the reduced portion of the visible part of the display is adapted to display information to a user.

21. The device of claim 1 wherein the first element and the second element are adapted to move in the first configuration to at least partially obscure the visible part of the display.

22. The device of claim 21 wherein information can be presented to a user from the partially obscured visible part of the display.

23. A portable electronic device having:
- a body;
- a first element slideably fitted to move in relation to the body between a first position and a second position;
- a user interface comprising a set of keys and a display, the display having a visible part, and the display comprising multiple lines for displaying information;
- a second element slideably fitted to move in relation to the body between a third position and a fourth position that is opposed to the first and second position, wherein the second element carries the display;
- a first configuration, in which the visible part of the display is reduced so that not all the display lines are visible; and
- a second configuration, in which the visible part of the display is extended so that more display lines are visible than in the first configuration.

24. A portable electronic device having:
- a body;
- a first element slideably fitted to move in relation to the body between a first position and a second position;
- a user interface comprising a set of keys and a display, the display having a visible part, and the display comprising multiple lines for displaying information;
- a second element slideably fitted to move in relation to the body between a third position and a fourth position that is opposed to the first and second position;
- moving means for moving one of the first element and the second element between its two positions on moving the other element between its two positions;
- a first configuration, in which the visible part of the display is reduced so that not all the display lines are visible; and
- a second configuration, in which the visible part of the display is extended so that more display lines are visible than in the first configuration.

25. A portable electronic device according to claim 24, wherein the means for moving the second element comprises one of the following: a resilient member and electrical moving means.

26. A portable electronic device having:
- a body;
- a first element slideably fitted to move in relation to the body between a first position and a second position;
- a user interface comprising a set of keys and a display, the display having a visible part, and the display comprising multiple lines for displaying information;
- a second element slideably fitted to move in relation to the body between a third position and a fourth position that is opposed to the first and second position;
- a first configuration, in which the visible part of the display is reduced so that not all the display lines are visible; and
- a second configuration, in which the visible part of the display is extended so that more display lines are visible than in the first configuration; and
- wherein said elements are slideable in the same plane and by the ends of the elements being against each other when the device is in the second configuration.

27. A portable electronic device comprising:

a body having a display;

a first lid slideably connected to the body, the first lid including a keyboard on an outer portion of the lid; and a second lid on a same plane as the first lid, slideably connected to the body, the first lid and second lid adapted to simultaneously move across at least a portion of the display, wherein a movement of the first lid and the second lid will expose or obscure the portion of the display, the display being useable in both an exposed and obscured configuration.

* * * * *